Dec. 11, 1934.   J. MORRISON   1,984,077
HINGED CLOSURE
Filed Oct. 16, 1931   3 Sheets-Sheet 1

Inventor
Jacob Morrison
By Popp + Powers
Attorneys

Dec. 11, 1934.   J. MORRISON   1,984,077
HINGED CLOSURE
Filed Oct. 16, 1931   3 Sheets-Sheet 2

Inventor
Jacob Morrison
By Popp & Powers
Attorneys

Dec. 11, 1934.   J. MORRISON   1,984,077
HINGED CLOSURE
Filed Oct. 16, 1931   3 Sheets-Sheet 3
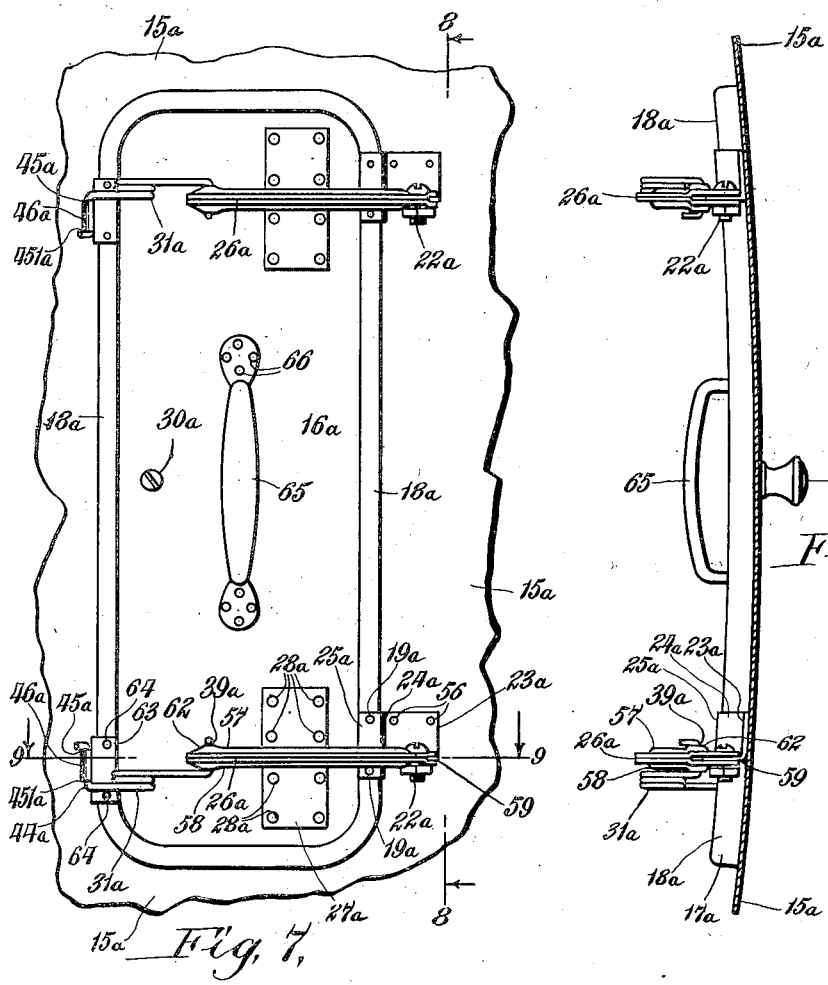
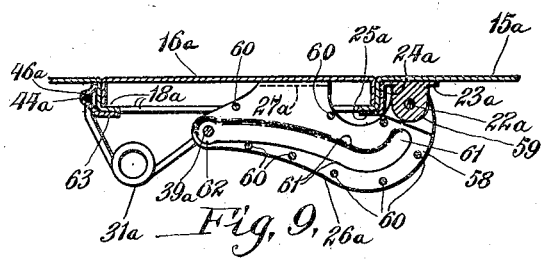

Patented Dec. 11, 1934

1,984,077

UNITED STATES PATENT OFFICE 1,984,077

HINGED CLOSURE

Jacob Morrison, Buffalo, N. Y., assignor to Morrison Steel Products Inc., Buffalo, N. Y., a corporation of New York Application October 16, 1931, Serial No. 569,258

6 Claims. (Cl. 180—69)

This invention relates to a hinged closure and more particularly to a hinged ventilating door for use on the side panels of an automobile hood and arranged in such manner as to permit of controlling the amount of air passing through the radiator and directed against the automobile engine which is located within said hood,— a plurality of such doors being independently mounted so as to permit any one or more of the same to be opened in accordance with the outside temperature, degree of humidity, etc.

The invention also relates to a curved cowl ventilator for controlling the temperature of and the amount of fresh air admitted to the interior of the automobile from the outside atmosphere.

One of the objects of the invention is to provide a sheet metal door of this character which does not rattle in either its open or its closed position, and in which, furthermore, no latch or similar complicated piece of mechanism is required for positively holding the same in place in either its open or closed position.

Another object of the invention is to eliminate the need for welding any of the parts of the hinged closure to the side panels or walls of the automobile hood, thereby eliminating any necessity of having such relatively large and awkward pieces of sheet metal subsequently ground off on their outer faces to remove the roughness which is an inevitable concomitant of any welding operation.

Still another object of the invention is to permit a relatively long cowl ventilator to be hinged at its ends to the curved cowl of an automobile and to turn on a straight line axis, said ventilator being curved relatively to said straight axis.

Numerous other objects of the invention and practical solutions thereof are disclosed in detail in the herein patent specification wherein:

In the accompanying drawings:

Figure 7 is an inside elevational view of a modification of the invention to adapt the same for use on the curved cowl of automobiles.

Figure 8 is a vertical, longitudinal section thereof taken on line 8—8, Fig. 7.

Figure 9 is a horizontal, transverse section of said cowl ventilator taken on line 9—9, Fig. 7.

In the following description similar characters of reference indicate like parts in the several figures of the drawings.

Figure 1:
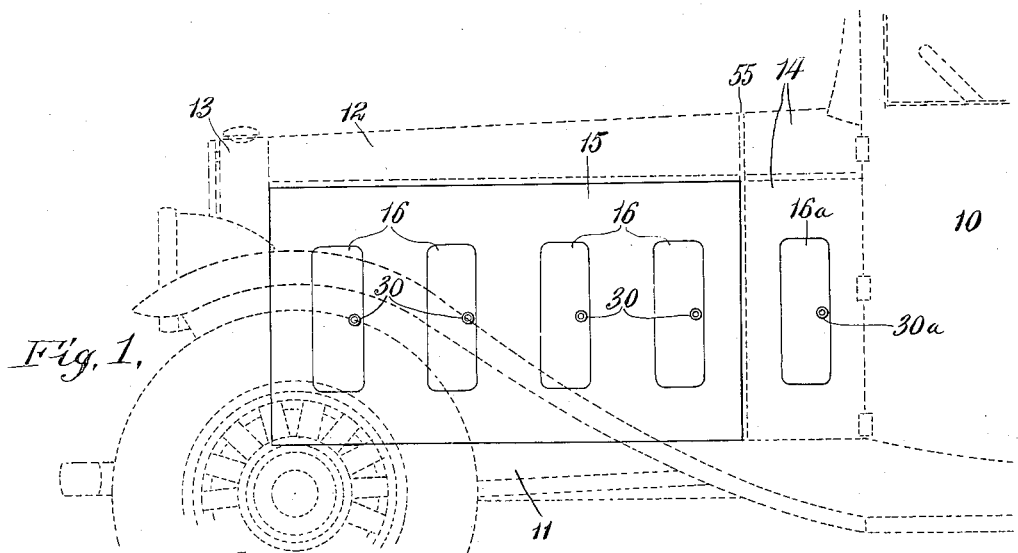
Figure 1 is a diminutive, fragmentary, side elevation of the front end of a typical automobile equipped with a hood having side panels which are provided with a plurality of hinged closures or doors constructed in accordance with the present invention.

My invention may be embodied in various forms and in hinged closures of different constructions and the present applications are therefore to be regarded merely as a few of the organizations which satisfactorily carry out the invention in practice. As here shown the same are constructed as follows:

In Fig. 1 is shown an automobile body 10 mounted on a chassis 11 and provided with the usual longitudinal hood 12 which spans the opening between the usual liquid cooling radiator 13 and the cowl 14. In the space enclosed by said hood 12 is the usual internal combustion engine (not shown) which is provided with a suitable fan to cause a stream of air through the radiator 13. It has been found desirable, under different outside temperature conditions, to vary the amount of air thus drawn through said radiator, and for this reason it has been found desirable to vary the freedom of discharge of said air from said hood 12. To accomplish this variability in the air flow and to compensate for different outside air temperatures and other seasonal and atmospheric changes, the side panels or side walls 15 of said hood 12 are provided with a plurality of doors 16 which are independently and vertically hinged at their forward ends to permit any one or more of the same being either opened or closed to control the flow of air from said hood 12.

Each side panel or wall 15 is provided with a plurality of peripheral casement flanges 17, each of which is rectangular in shape with rounded corners and extends inwardly and perpendicularly of said side wall 15. Said casement flanges are constructed of sheet metal in a suitable stamping press and are preferably made integrally with said side wall 15 in a manner well known in sheet metal stamping practice. The innermost end of each casement flange 17 is integrally connected with a rectangular, peripheral step or stop flange 18 which is formed symmetrically with respect to and extends perpendicularly of said peripheral casement flange 17, extending parallel to the companion side wall 15 and projecting inwardly toward the rectangular opening formed by said casement flange.

Adapted to be received within said rectangular opening is the hinged door 16, the outer face of which is preferably disposed flush with the outer face of the wall 15 when said door is in its fully closed position as shown in Figs. 1, 2, 3, 4 and 6. Each door 16 is provided with an edge flange 21 which extends inwardly and perpendicularly of the main panel of said door and is adapted to bear with its inner edge, when the door is closed, against the outer vertical face of the aforesaid stop flange 18 of the wall 15.

Figure 2:
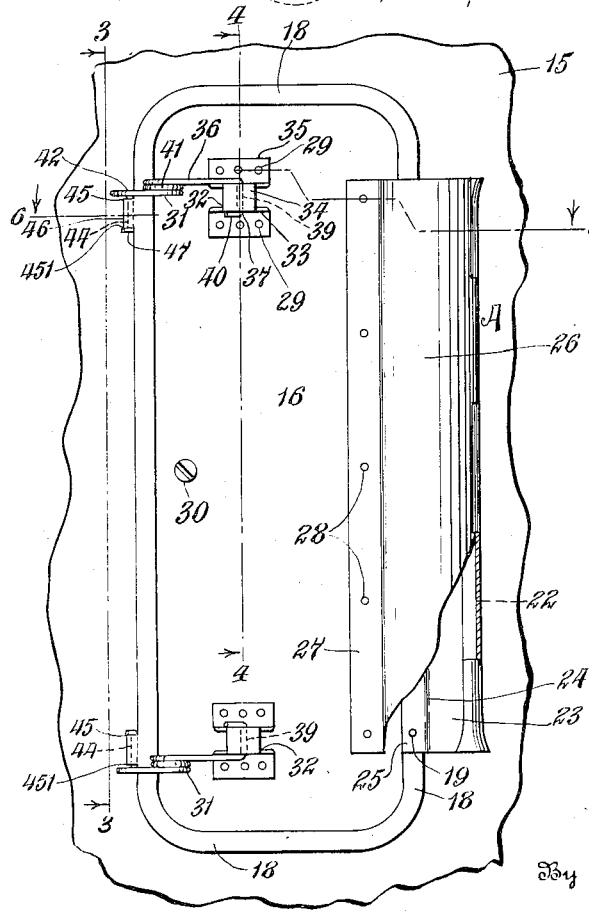
Figure 2 is a fragmentary, vertical elevation of one of these doors looking at the same from the inside of the hood.
Figures 3, 4:
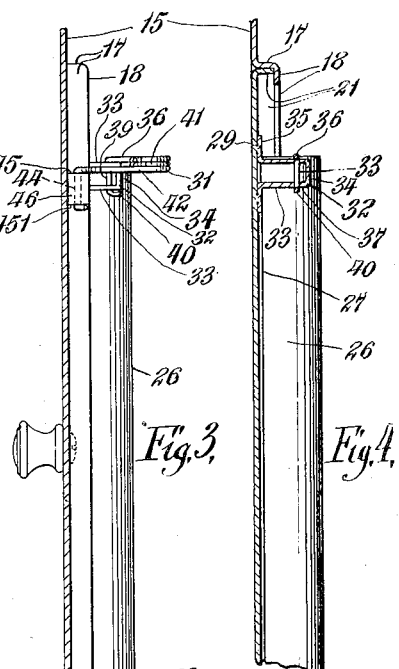
Figures 3 and 4 are fragmentary, vertical sections thereof taken on correspondingly numbered lines of Fig. 2.
Figure 5:
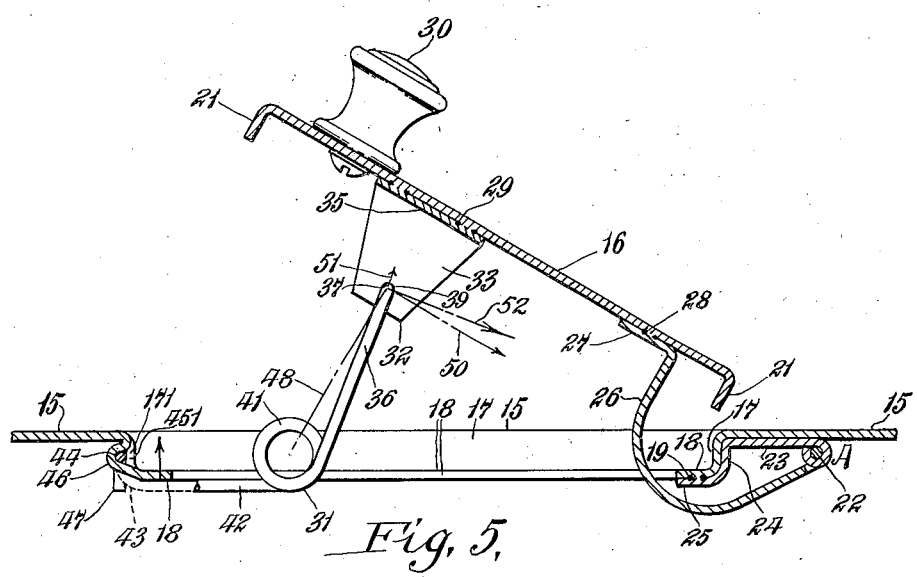
Figure 5 is an enlarged, horizontal, transverse section through said door showing the same in its fully opened position.
Figure 6:
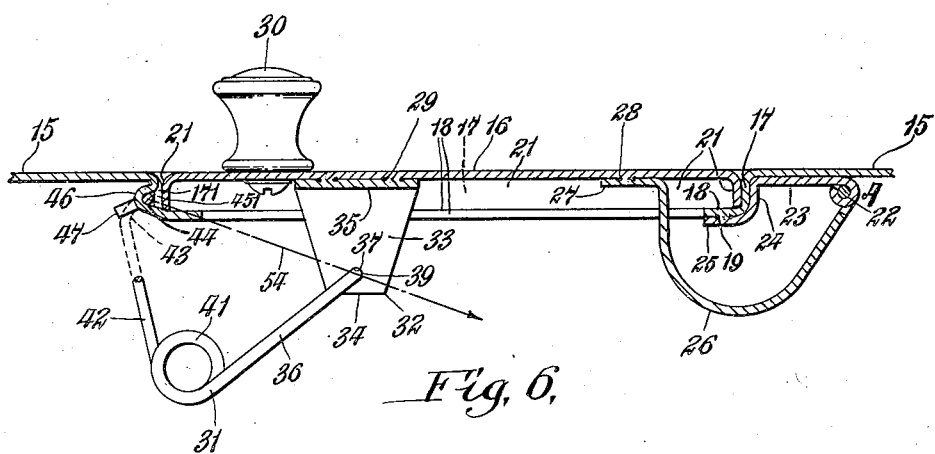
Figure 6 is an enlarged, horizontal, transverse section through said door taken on line 6—6, Fig. 2, and similar to Fig. 5 but showing said door in its fully closed position.

Each door 16 is hinged upon its hinge pin 22 in the following manner: A hinge A is provided which has two leaves that are pivotally joined at the pivot 22 in the interlocking manner customarily employed in hinge construction. The outer one of the leaves of said hinge A comprises a distancing plate 23, the rear end of which is bent inwardly to form an integral abutting flange 24. The latter is, in turn, provided at its innermost end with an integral securing flange 25 which extends perpendicularly of said abutting flange 24 and parallel to the distancing plate 23. This securing flange is spot welded at 19 as shown in Figs. 2, 5 and 6, to the stop flange 18 of the wall 15. By this construction the slight roughness upon the outer face of said stop flange 18, which is caused by the spot welding operation, is concealed, because of the fact that the door 16 (when in either closed or open position) effectively covers over the same as far as outward appearance is concerned, and has, in addition, its inner face concealed by the arcuate hinge leaf 26 to be presently described. By reason of the fact that spot welding 19 is made between the securing flange 25 of said hinge A and the stop flange 18 of the wall 15 it naturally follows that the distance between the pivot 22 of said hinge and the casement flange 17 of said wall 15 is maintained in accurate position irrespective of any distortions which might be caused by said spot welding 19.

The other leaf of said hinge A is of bowed or arcuate form and constitutes an arcuate hinge leaf 26 the extreme outer rear end of which is bent sharply inward to form a welding flange 27, which is spot welded at a plurality of points 28 (see Fig. 2) to its companion door 16. Such a welding operation does, to be sure, cause a certain amount of roughness on the outer face of said door 16 but this is not particularly objectionable inasmuch as these doors are small in size and light in weight and therefore do not present any awkward difficulties as to the grinding or dressing off of the roughness of said welds 28. In any case, it is necessary to somehow or other secure the hinge A to both the wall 15 and to the door 16, and the present construction enables the same to be effected without requiring the panel 15 to be ground or dressed down for the purpose of removing welding irregularities. In the present construction the only requirement is that the relatively small door 16 be so ground or dressed off.

Each door 16 is adapted to be manually moved (through the instrumentality of a suitable finger knob 30) to either its extreme open position as in Fig. 5 or to its fully closed position as in Fig. 6. Said door is rigidly but resiliently held in both its extreme open and also in its fully closed position by an L-shaped spring 31 which is suitably connected pivotally at its opposite ends with its companion door 16 and with the wall 15. The pivotal connection of said spring with its companion door 16 is effected by the provision of a bracket 32 which is made of bent sheet metal and comprises two side walls or webs 33 which are integrally joined at their outer ends by a transverse tie wall 34 and are provided at their inner ends with the out-turned flanges 35 which are spot welded at a plurality of points 29 to their companion door 16. The one arm 36 of each spring 31 is bent sharply vertical to form a pivot finger 39 which is pivotally received within a pair of suitable pivot holes 37 drilled vertically through the two webs 33 of its companion bracket 32. The extreme tip of said pivot finger 39, after having been passed through said bracket 32 (during the assembly operation) is bent sharply horizontally at 40 so as to thereafter prevent disengagement of the spring 31 from said bracket 32. The central part of said spring 31 is preferably provided with one or more circularly spiral coils 41 so as to provide a suitably soft resilient action, this resilience exerting a force in such a direction as to always tend to increase the size of the acute angle lying between the two arms of said spring 31 so as to constitute therefrom an "L" shaped compression spring.

The other arm 42 of said compression spring 31 is slightly curled horizontally at 43 and is then bent sharply vertically to form the pivot finger 44 which forms the pivotal connection between said spring 31 and the wall 15 that constitutes the automobile side hood panel. To receive the vertical spring pivot finger 44, of each compression spring 31, the metal of the rear vertical casement flange 171 is horizontally slit in two places at 45 and 451 and the metal between said slits pushed outwardly to form a semi-cylindrical pivot seat 46 which prevents outward displacement of the pivot finger 44,—inward displacement thereof being prevented by the abutting of the opposite ends of said pivot finger against the outer face of the casement flange 171 of which the pivot seat 46 forms an integral part. The extreme end of said pivot finger 44 is bent sharply horizontal at 47 (after the parts have been assembled in position) to prevent disengagement of said pivot finger 44 from its pivot seat 46.

It will be noticed that, with the door 16 in fully opened position as in Fig. 5, the slightly curled portion 43 of the compression spring 31 and also the adjacent portion of the one spring arm 42 both bear against the inner face of the stop flange 18. This prevents any further counter-clockwise rotation of the spring arm 42 about the pivot finger 44 as a center of rotation. The natural tendency of the entire spring 31 is such as to at all times resiliently urge apart its pivot fingers 44 and 39. In the position of Fig. 5, however, the one (inner) spring arm 42 is restrained and may be dynamically considered, at this time, as a part of the wall 15. This results in a resilient force being imposed upon the pivot finger 39 about the geometrical line 48 in the direction of the arrow 50 which creates a force inwardly of the hinge pin 22. This force 50 tends to cause a counter-clockwise movement of the door 16 about its hinge pin 22.

This movement is resisted by the force component 51, the resultant 52 of the two components 51 and 50 being in a line which necessarily passes through the axis of the hinge pin 22. This causes a thrust against said hinge pin and this prevents the door 16 from rattling even though the hinge joint has been constructed with such generous working tolerances as would otherwise cause a noisy vibration of the various metal parts constituting the ventilator door as a whole. It will also be noticed that this result is obtained without the use of any rubber or other sound deadening material in the construction of the door.

In Fig. 6 is shown the position of the door 16 in its closed position, in which position also the resilience of the compression spring 31 prevents the door from rattling without the use of any rubber or other special sound deadening material. In the first part of the movement of said door 16 from the open position of Fig. 5 to the closed position of Fig. 6, the arm 42 of the compression spring 31 is first pushed away from the inner vertical face of the stop flange 18 of the wall 15. This immediately changes the direction and pressure of the force components 51 and 50 and causes a heavy resilient pressure tending to turn the door 16 in a counter-clockwise position about its hinge pin 22. This force therefore acts to resiliently hold the door in its fully opened position even though it should be accidentally moved some distance inwardly from its fully opened position.

Continuing the closing movement of said door 16 causes the same to be moved inwardly past a dead center position in which position both of the pivot fingers 44 and 39 of the spring 31 and also the hinge pin 22 all lie in a single straight plane. Movement of said door 16 inwardly of this dead center position causes the spring 31 to resiliently urge the door 16 in a counter-clockwise direction, as indicated by the force component 54 of Fig. 6. It should be noticed that this force component 54 is not perpendicular of the door 16 but is oblique relatively thereto. This direction of the resilient force not only causes said door to be firmly though resiliently held in its closed position but also imposes a resilient lateral thrust which prevents such rattles as would otherwise occur if the working tolerances of the various working parts were too generous.

The door of Figs. 2–6 heretofore described is very strong and practical but is confined to conditions which permit of using a flat door. In some circumstances such a flat door cannot be employed as, for instance, (see Fig. 1) in the curved cowl 14 which is located just to the rear of the dashboard 55 of the automobile body 10. This is because the hinge pin 22 is of considerable length and is arranged parallel to its companion door 16. To apply the invention where such a curved condition exists, the modified form of door 16a shown in Figs. 7–9 is employed. In this case the hinge comprises a pair of hinge pins 22a mounted in companion sheet metal brackets 59 each of which is provided with a distancing plate 23a, an abutting flange 24a and a securing flange 25a similar to the hinge construction of Figs. 2–6. Each bracket is provided with a flange 25a which is suitably welded at 19a to the stop flange 18a of the wall 15a and, if desired, though not necessarily, its foot 23a is welded at 56 directly to said wall 15a. The remaining part of each hinge unit consists of a hinge leaf 26a, constituted of a pair of pressed sheet metal hinge leaf sections 57 and 58 which are spot welded together at the spots 60 and are centrally dished at 61 to provide adequate lateral strength. Each hinge leaf section is provided with a splay foot or lateral welding flange 27a which is spot welded to the door 16a at the spots 28a. The front ends of the pairs of leaf sections 57 and 58 are spread apart to receive their companion bracket 59, thus making the hinge.

This door is provided with a two armed compression spring 31a coiled at 31a and otherwise similar to the spring 31 of Figs. 1—6. Said spring is pivoted at one end at 39a to the expanded end or head 62 of the hinge leaf 26a and is pivoted at its other end at 44a to the curled portion 46a of a clip 451a having a flange 63 which is spot welded at 64 directly to the stop flange 18a. The door 16a may be provided with an exterior knob or small handle 30a as in the construction of Figs. 1-6 but, inasmuch as it is used principally to ventilate the driving compartment of the car and hence should be manipulatable from the inside of the vehicle, is also provided with an inside handle 65 which is suitably welded at 66 to said door 16a.

I claim:

1. A hinged closure of the character described and comprising a wall having a casement flange which is offset at one point to form a pivot socket which is parallel to said flange and to said wall; a door hinged to said wall; and a spring adapted to hold said door in either its open or closed position and connected at one end to said door and provided at its other end with an arm which passes through said offset pivot socket.

2. A hinged closure of the character described and comprising a wall having a casement flange which is offset at one point to form a pivot socket which is parallel to said flange and to said wall; a stop flange arranged at the inner end of said casement flange; a door hinged to said wall; and a spring adapted to hold said door in either its open or closed position and connected at one end to said door and provided at its other end with an arm which passes through said pivot socket and is adapted to limit the lateral movement of said spring in the one direction by coming into contact with said stop flange.

3. A hinged closure of the character described and comprising a sheet metal wall having a casement flange; a hinge having a distancing plate and an abutting flange which latter is connected with the casement flange of said wall; a door secured to said hinge; and means for positively holding said door in either its open or its closed position.

4. A hinged closure of the character described and comprising a sheet metal wall having a casement flange and a stop flange; a hinge having a distancing plate and an abutting flange and a securing flange, the latter being directly secured to said stop flange of said wall; and a door secured to said hinge.

5. A hinged closure of the character described and comprising a sheet metal wall having a casement flange and a stop flange; a door; a hinge provided with two leaves and having one of its leaves of arcuate form and secured to said door and having its other leaf provided with a distancing plate and an abutting flange and a securing flange, the latter of which is directly secured to said stop flange of said wall.

6. A hinged closure of the character described and comprising a sheet metal wall having a casement flange and a stop flange; a door; a hinge provided with two leaves and having one of its leaves of arcuate form and secured to said door and having its other leaf provided with a distancing plate secured to said wall; a sheet metal bracket having a pair of webs joined at their outer ends and having their inner ends secured to said door; and a compression spring connected at one end to said wall and at its other end to said bracket.

JACOB MORRISON.